United States Patent
Matay

[15] 3,690,153
[45] Sept. 12, 1972

[54] ULTRASONIC DISTANCE AMPLITUDE CORRECTION UNIT

[72] Inventor: Istvan M. Matay, North Royalton, Ohio

[73] Assignee: TRW Inc., Cleveland, Ohio

[22] Filed: Dec. 7, 1970

[21] Appl. No.: 95,538

[52] U.S. Cl. .............................................. 73/67.8 R
[51] Int. Cl. ............................................ G01n 29/00
[58] Field of Search............ 73/67.5, 67.7, 67.8, 67.9; 340/3

[56] References Cited

UNITED STATES PATENTS

| | | | |
|---|---|---|---|
| 2,583,531 | 1/1952 | Hathway | 340/3 R |
| 3,048,031 | 8/1962 | Beajard | 73/67.8 |
| 3,090,224 | 5/1963 | Rankin | 73/67.9 |
| 3,287,962 | 11/1966 | Relyea et al. | 73/67.9 |

Primary Examiner—Richard C. Queisser
Assistant Examiner—Arthur E. Korkosz
Attorney—Hill, Sherman, Meroni, Gross & Simpson

[57] ABSTRACT

An automatic distance amplitude correction device and circuit which automatically corrects for amplitude variations in signals such as caused by the attenuation of sound propagating through a test specimen. A signal is transmitted through a test specimen and the reflection is detected and used to control the time constant of an integrating circuit so that the signal applied to a compensating network for controlling the gain in the receiver is automatically adjusted as a function of the amplitude of the received signals.

4 Claims, 9 Drawing Figures

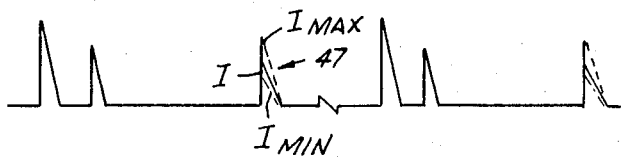
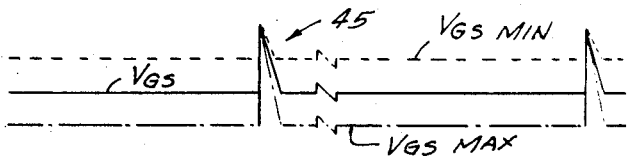
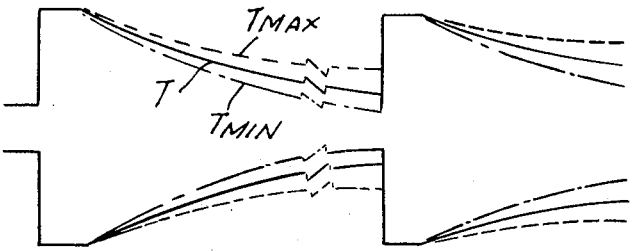
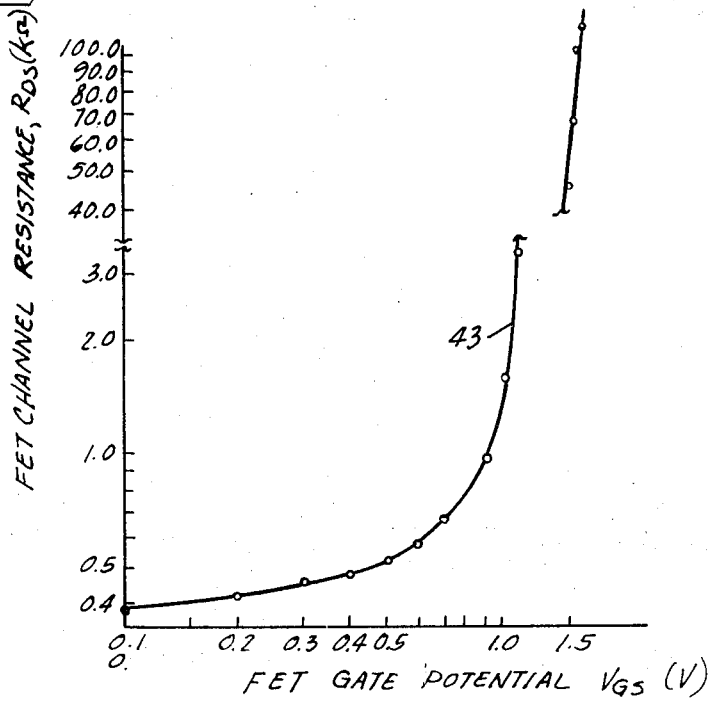
INVENTOR.
ISTVAN M. MATAY

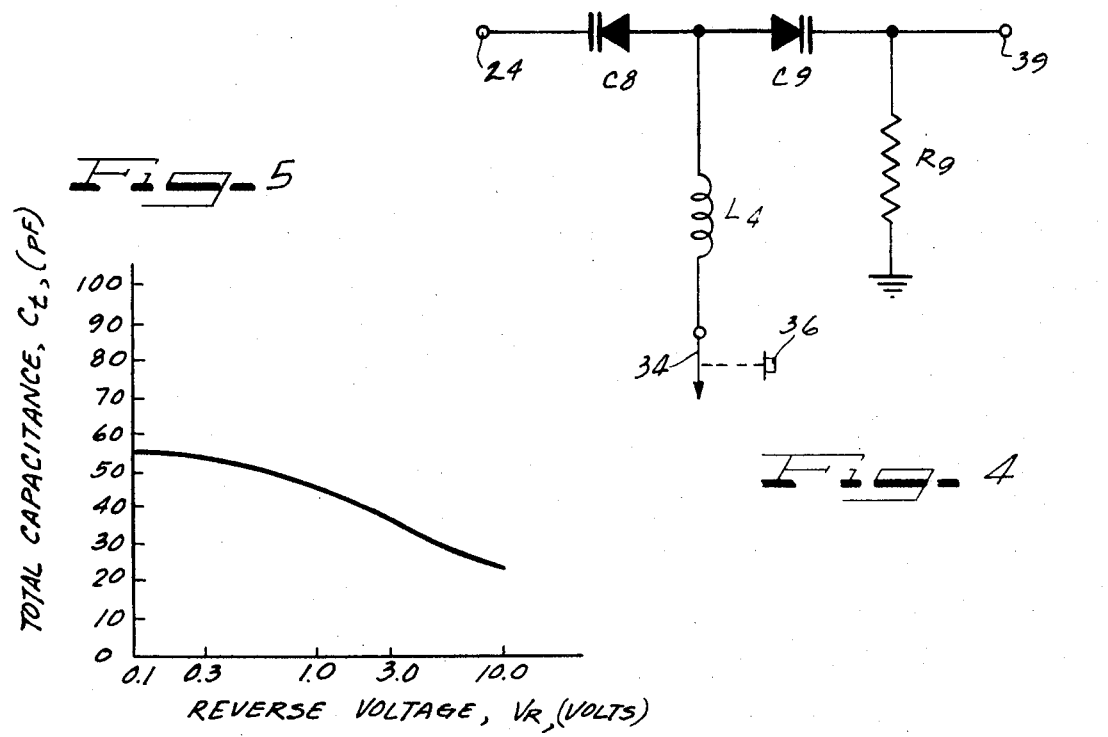
Fig-5
Fig-4
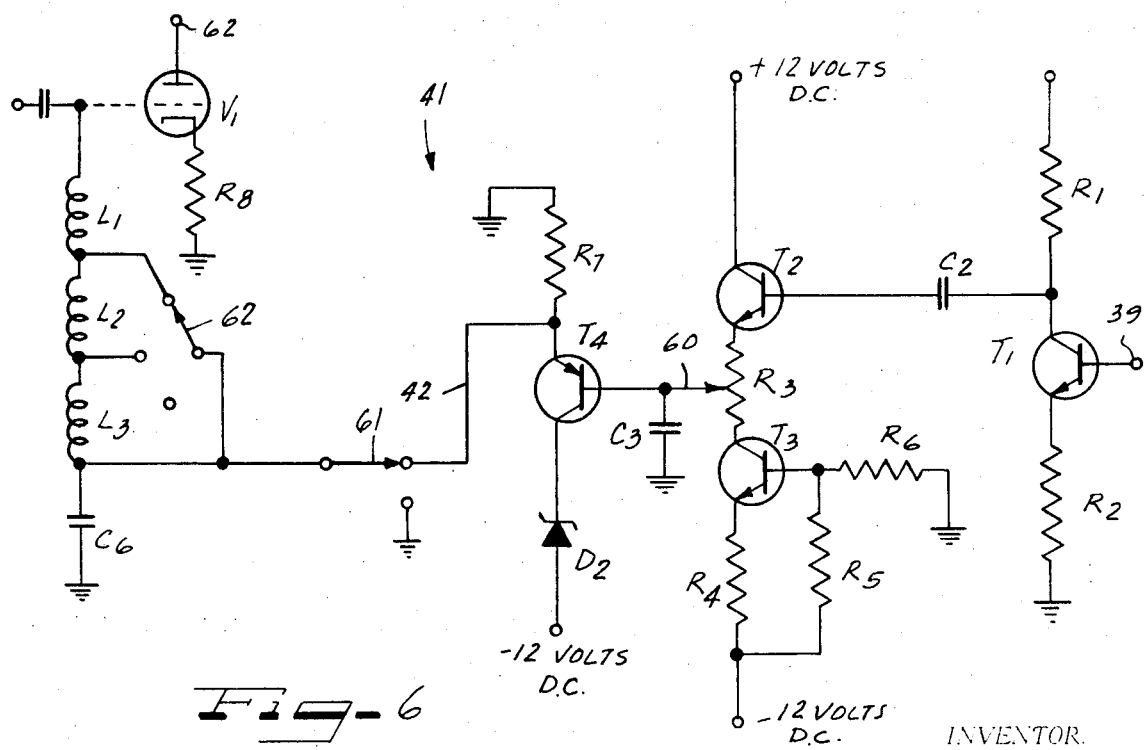
Fig-6
INVENTOR.
ISTVAN M. MATAY 3,690,153

ULTRASONIC DISTANCE AMPLITUDE CORRECTION UNIT

BACKGROUND OF THE INVENTION

1. Field of the Invention

This invention relates in general to ultrasonic non-destructive test equipment and in particular for automatic means for controlling the receiver sensitivity so as to adjust for the attenuation of sound propagation through a test specimen.

2. Description of the Prior Art

Ultrasonic non-destructive test equipment has provided for controlling the sensitivity of the receiver in which a time constant circuit has been utilized to provide an exponential decay of an applied voltage which is used to vary the sensitivity of the receiver. The time constant circuit has been statically adjusted in the past as for example by varying the value of capacitance or resistance and the same time constant has been used for testing as long as the manual adjustment of the resistance and capacitance are not changed.

SUMMARY OF THE INVENTION

The present invention comprises an improvement in ultrasonic test equipment in that an automatic correction for the variable response characteristics in the ultrasonic tests which are caused by material structure is obtained. The effects of variable attenuation in the test specimen are compensated by detecting a signal from the test specimen whose response is proportional to the specimen's attenuation and by controlling the time constant automatically of an exponential circuit in response to the amplitude of the reflected or transmitted signal. Thus the exponential circuit provides for a continuously varying time constant dependent on the amplitude of received signals and the output of this circuit is utilized to vary the sensitivity of the receiver to provide a uniform signal independent of the thickness and attenuation of the specimen. Since the output of the receiver is presented on a time base, the reflections from various discontinuities in the specimen will be more realistically presented to an observer and the variations in amplitude of signals caused by varying distances and attenuations in the specimen will be compensated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 2 is a plot of gate potential versus channel resistance of a field effect transistor;

FIGS. 3A-3D illustrate wave shapes appearing at different points in the invention;

FIG. 4 illustrates a modification of variable time constant circuit;

FIG. 5 illustrates the voltage versus capacitance characteristic of the circuit of FIG. 4; and FIG. 6 is a schematic view of the compensating network illustrated in FIG. 1.

DESCRIPTION OF THE PREFERRED EMBODIMENTS

Figure 1:
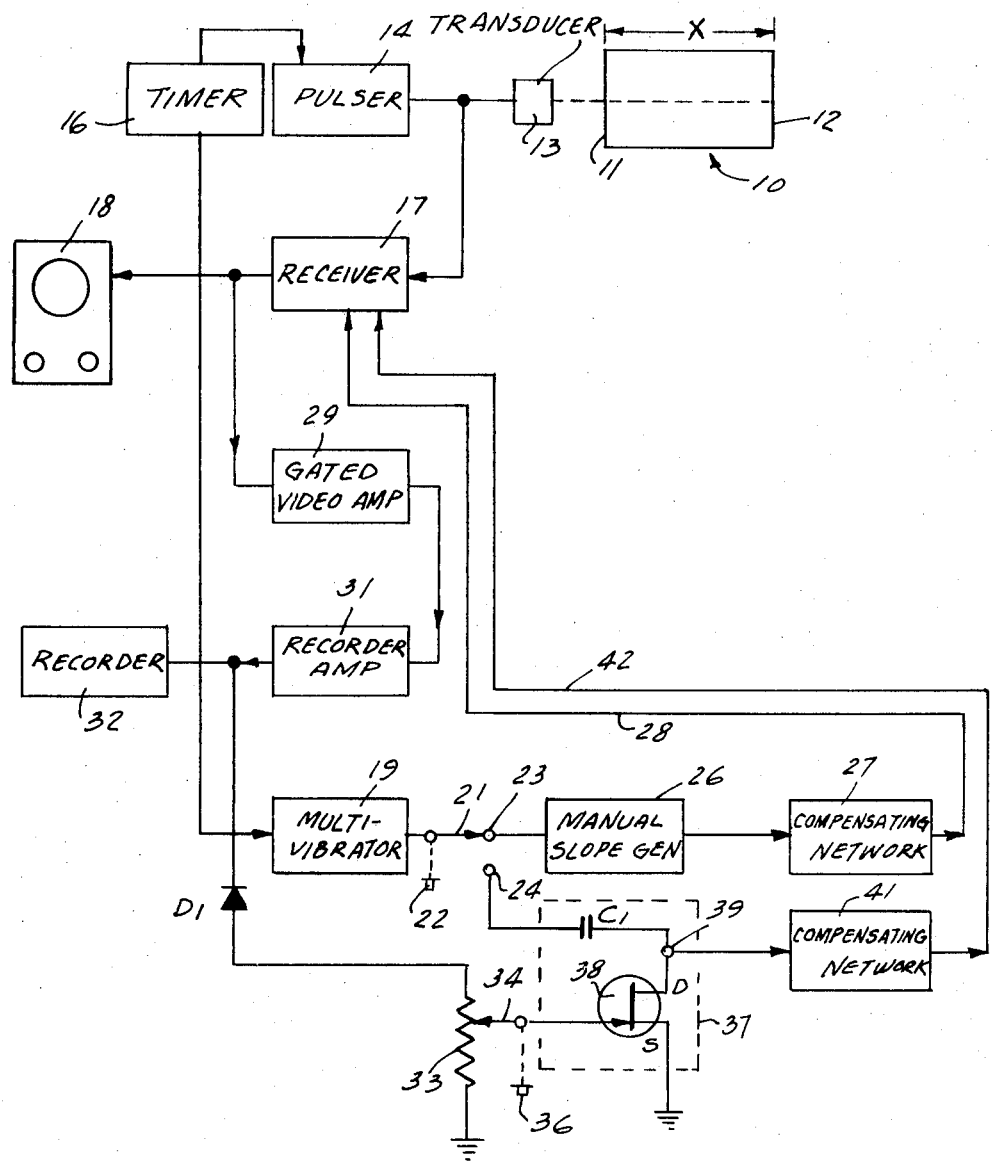
FIG. 1 illustrates test equipment with the invention incorporated therein.

FIG. 1 illustrates in block form an ultrasonic test equipment for testing the characteristics of a specimen 10. A pulser 14 periodically applies to the specimen 10 an ultrasonic signal through the transducer 13. The signal passes then to the specimen at the front interface 11, passes through the specimen and is reflected from the rear interface 12. The reflected signal passes through the transducer 13 and to a receiver 17 which applies an output on a scope 18. A timer 16 supplies an input to the pulser 14 so that it periodically transmits a signal to the specimen and also supplies an input to a multivibrator 19 which is connected to a switch 21 that may be controlled by the knob 22. In a first position of the switch 21 it engages contact 23 to apply the output of the multivibrator 19 to a manual slope generator 26. The output of the manual slope generator 26 is connected to a compensating network 27 that applies an input to the receiver 17 through the lead 28 which controls the amplitude sensitivity of the receiver 17 as a function of distance through the specimen 10. The ultrasonic test equipment also provides a gated video amplifier 29 which receives an input from the output of the receiver 17 and applies an output to a recorder amplifier 31 which supplies an output to a recorder 32 for making a permanent record of the response of the specimen.

The improvement of the present invention utilizes the output of the amplifier 31 applied through a diode D1 to resistor 33 which has its other side grounded. A slide contact 34 is controllable by a knob 36 and applies an input to the gate of a field effect transistor 38. The source of the field effect transistor is connected to ground and the drain is connected to contact 39. A capacitor C1 is connected between contact 39 and contact 24 which may be connected to movable contact of switch 21 to receive the output of the multivibrator 19. A compensating network 41 receives a signal from contact 39 and applies an input to the receiver 17 through lead 42.

When the switch 21 engages the contact 23 to apply the output of the multivibrator 19 to the manual slope generator 26, the apparatus of FIG. 1 operates according to the prior art. The multivibrator 19 is keyed by the timer 16 and produces pulses 48 illustrated in FIG. 3C which are applied to the manual slope generator 26 that might comprise an RC circuit for producing an exponential decay of the pulse 48 and which is applied to the compensating network 27 which in turn controls the gain of the receiver 17 through the lead 28. The manual slope generator 26 according to the prior art has a fixed characteristic for a given attenuation value and once set produces a fixed output wave shape and the compensating network 27 provides a fixed sensitivity control output to the receiver 17 as a function of distance. These prior art devices adjust the beam energy intensity characteristics as a function of sound travel distance from the transducer 13 and as a function of distance for the attenuation characteristics due to the material structure of the specimen 10. The slope generator 26 is set for a particular transducer and for a particular amount of attenuation. However, where the attenuation coefficient of materials vary greatly, the automatic distance amplitude correction unit of the present invention is desirable which provides an automatic correction for the variable response characteristics in the specimen under test which are caused by the material's structure.

Variations in sound intensity result whenever the material in the travel path of the ultrasonic beam reflects or absorbs more or less of the ultrasonic energy. The reflected energy in the ultrasonic wave front that is returned to the transducer 13 in pulse echo tests is relatable to the dimension of a defect. If the amount of energy reaching a defect varies, the reflected energy from such defect will also vary.

The automatic distance amplitude correction unit according to this invention provides for a more consistent display of images of defects which are related to the defect size by correcting for variable attenuation through the medium.

When the switch 21 in FIG. 1 engages contact 24 so as to connect the variable time constant circuit 37 into the system, automatic distance-amplitude correction will occur.

The operation of this circuit will be explained with reference to the wave shapes illustrated in FIGS. 3A-3D. The intensity of any received signal from within the material is a function of the thickness $x$ of the material and the attenuation coefficient $\alpha$ for a given material and the sound energy transmitted into the specimen.

$$I = I_o e^{-\alpha x}$$

Where I is the intensity of the received signal, $I_o$ is the transmitted signal.

In thick materials the attenuation becomes significant and must be corrected for by varying the gain of the receiver as a function of distance (time). The intensity of the ultrasonic waves in the material decreases exponentially in accordance with the above formula as a function of both attenuation and thickness. The amplifier sensitivity is controlled as a function of time (distance) to provide a uniform signal regardless of the distance (thickness) and attenuation relationships. The prior art correction unit is illustrated with the circuit when switch 21 is engaged with contact 23 but is subject to the disadvantage that the correction assumes a constant attenuation which is fixed and depends on the particular characteristics of the manual slope generator 26 and the compensating network 27. Variations in intensity caused by changes in attenuation are ignored. In the present invention, however, there is an automatic correction for attenuation variations illustrated with the switch 21 in engagement with contact 24, the wave shape illustrated in FIG. 3D is applied to the ultrasonic receiver 17 through the compensating network 41 in order to control its sensitivity to achieve a constant intensity I. This control signal can be generated by monitoring the pulse amplitude reflected from the rear interface of the test specimen, the pulse amplitude of the noise generated due to reflections from the specimen's structure or the pulse amplitude of a through transmitted signal. It is to be noted that as shown in FIG. 3D the exponential control signal varies between $T_{max}$ and $T_{min}$. The wave shape illustrated in FIG. 3D is established by an RC network comprising the fixed capacitor C1 and a variable resistor comprising the drain to source impedance of the field effect transistor 38. The field effect transistor 38 has its source connected to ground and its drain connected to the capacitor C1. By varying the potential on the gate of the field effect transistor 38, its drain to source impedance may be varied as illustrated by curve 43 in FIG. 2. For example, FIG. 2 illustrates the channel resistance versus gate potential of a field effect transistor that might be a type HEP-801 which might vary between 0.4 to 100 k$\Omega$ as the gate potential is varied respectively from 0.1 to 1.5 volts. Thus by varying the gate potential of the FET 38 the time constant of the circuit 37 can be adjusted.

The time constant circuit 37 differentiates the trailing slope of the square wave output of the multivibrator 19 comprising the pulses 48 illustrated in FIG. 3C. The field effect transistor has a square law characteristic and its channel resistance between its drain to source may be varied over a wide range. The control of the resistance from drain to source of the field effect transistor is made to be proportional to the attenuation of material under test. The signal proportional to the attenuation of the material under test is obtained from the recorder amplifier 31 through the diode D1 and is applied to the resistor 33 and supplied from the variable tap 34 to the gate of the field effect transistor 38. The diode D1 comprises a feedback uncoupling means. The automatic distance amplitude correction circuit operates as follows. The variable attenuation of the material will cause the emergent signal to vary between the values of $I_{max}$ and $I_{min}$ illustrated in 3A by pulses 47. The gated video signal passing to the amplifier 31 will vary between $V_{GSmax}$ and $V_{GSmin}$ illustrated in FIG. 3B by wave shapes 45. This signal will be applied to the resistor 33 and the contact 34 to the gate of the field transistor 38 to obtain various channel resistances as illustrated in FIG. 2. Thus the time constant of the network 37 will vary between the values of $T_{min}$ and $T_{max}$ as shown in FIG. 3D. The output signal appearing at terminal 39 will be applied to control the gain of the receiver 17 through the compensating network 41 to automatically correct for distance amplitude variations.

FIG. 6 is a schematic of a compensating network 41 utilized in an actual embodiment of the invention. The output terminal 39 of the variable time constant circuit 37 is connected to the base of a transistor T1 forming part of the compensating network 41. The emitter of the transistor T1 is connected to ground through resistor R2. The collector of transistor T1 is connected to a suitable bias source through a resistor R1. Coupling capacitor C2 couples an output signal to a direct current level shifter comprising the transistors T2 and T3 in order to raise the control signal by R3 to the required bias level of the ultrasonic RF amplifier tube in the receiver 17. The collector of transistor T2 is connected to a suitable bias source and the emitter is connected to a resistor R3 which has its other side connected to the collector of transistor T3. The emitter of transistor T3 is connected to a bias source through resistor R4 and the base is connected to the bias source through a resistor R5. The base is also connected to ground through a resistor R6.

A variable contact 60 engages the resistor R3 and is connected to the base of an emitter-follower transistor T4. Capacitor C3 is connected between ground and the base of transistor T4. A zener diode D2 is connected between a bias source and the collector of transistor T4 and a resistor R7 is connected between the emitter of transistor T4 and ground. The output of the compensating circuit 41 is applied to lead 42 and is applied through a switch 61 to the grid of an amplifier tube V1 which might be in the third RF amplifier stage of the receiver 17, for example. In a typical commercial unit a capacitor C6 is connected between ground and lead 42 and inductors L1, L2 and L3 are connected in series between the grid of the tube V1 and the capacitor C6. The switch 62 is connected to selectively short out the inductors L2 and L3. A resistor R8 is connected between the cathode of tube V1 and ground. The plate of tube V1 is connected to terminal 62.

In an actual circuit the component values of elements in FIG. 6 were as follows:

| R1 | 5.9 | kΩ | R6 | 2 | kΩ |
|---|---|---|---|---|---|
|  | 1.8 | kΩ | R7 | 200 | Ω |
| R3 | 1 | kΩ | R8 | 200 | Ω |
| R4 | 1 | kΩ | C2 | 0.05 | μF |
| R5 | 680 | Ω | C3 | 1500 | pF |
|  |  |  | C6 | 0.02 | μF |

Transistors T1, T2 and T3 were type NPN 2N585; transistor T4 was type PNP 2N404; Zener diode D2, type 1N752; −12 Volts bias was applied to the diode D2 and to the resistor R4; and, +12 Volts bias was applied to the collector of transistor T2 and to the resistor R1.

The circuit of FIG. 6 allows the automatic distance amplitude output signal to be inverted so that it is negative and such that it may be applied to the grid of the tube V1 of the RF amplifier. It is to be noted that the signal appearing at terminal 39 is a positive signal and that this signal could be used directly to control the gain of the RF amplifier. It would be applied to the cathode of the RF amplifier stage. However, the use of the circuit of FIG. 6 allows this signal to be inverted so that negative signal may be applied to the grid of the amplifier stage V1. Although the compensating circuit illustrated in FIG. 6 is shown as connected to only a single radio frequency amplifier stage in the receiver 17, it is to be realized that the automatic distance amplitude correction signal may be applied to all of the RF amplifier stages at appropriate rates. Also, in order to achieve smooth control the amplifier tubes are selected so that they do not operate in the vicinity of cut-off.

A modification of the invention is illustrated in FIG. 4 wherein the variable time constant circuit 37 comprises a fixed resistor R9 connected in circuit with voltage variable capacitors C8 and C9. As shown in FIG. 4, the output from multivibrator 19 may be applied through terminal 24 to voltage variable capacitor C8 which is connected in series with a second voltage variable capacitor C9 to output terminal 39. Resistor R9 is connected between the output terminal 39 and ground. The control voltage is applied from wiper contact 34 through an inductor L4 to the junction point between the voltage variable capacitors C8 and C9. The total capacitance of the voltage variable capacitors C8 and C9 varies as shown in FIG. 5 as a function of the voltage applied to wiper contact 34. The voltage variable capacitors' voltage dependent P/N junction capacitance $C_t$ is controlled by its reverse-bias control voltage illustrated in FIG. 3B which is in turn proportional to the attenuation of material under test. The automatic distance amplitude correction operation for a voltage variable capacitor is as follows: The material's variable attenuation will cause the emergent signal to vary between the values of $I_{max}$ and $I_{min}$ and the gated echo level controlled recorder signal of the ultrasonic unit's gate will also vary between $V_{GSmax}$ and $V_{GSmin}$ as shown in detail in FIG. 3B. This signal will cause the voltage variable capacitors' P/N junction capacitance, $C_t$, to vary in accordance with its characteristic curve illustrated in FIG. 5. FIG. 5 is a voltage variable capacitor characteristic for a type TIV303 Texas Instrument's Capacitor.

Thus, by varying the voltage at wiper 34 the time constant of the circuit illustrated in FIG. 4 will vary to change the characteristic of the output signal at terminal 39. This signal is applied as a bias signal to the receiver to maintain the receiver output constant. Although a voltage variable capacitor is illustrated, it is to be realized that such devices are also referred to as "varactors," "varactor diodes," and "varicaps" in the electronic industry.

Two voltage variable capacitors are used so as to isolate the control voltage appearing at terminal 34 from the input square wave signal applied at terminal 24. The inductor L4 is utilized to avoid possible feedback effects.

It is seen that this invention provides an automatic distance amplitude correction circuit for automatically compensating for attenuation of signals due to sound wave attenuation and travel distance.

Although the invention has been described with respect to preferred embodiments it is not to be so limited as changes and modifications may be made therein which are within the full intent and scope as defined by the appended claims.

I claim:

1. An automatic distance amplitude correcting device for a receiver for testing a specimen comprising:
    means for periodically transmitting a signal through said specimen;
    said receiver receiving said signal from said specimen;
    an automatic gain control element in said receiver;
    a multivibrator connected to said means for periodically transmitting a signal;
    an automatically variable time constant circuit receiving an output of said receiver and the output of said multivibrator; and
    a compensating network receiving the output of said automatically variable time constant circuit and supplying an output to said automatic gain control element in said receiver which comprises a voltage which exponentially decays at a rate depending on the output of said automatically variable time constant circuit.

2. An automatic distance amplitude circuit according to claim 1 wherein said automatically variable time constant circuit comprises:
    a capacitor with one side connected to the output of said multivibrator;
    a field effect transistor with its drain connected to the other side of said capacitor and to the input of said compensating network; and
    the gate of said field effect transistor connected to the output of said receiver to vary the impedance across the field effect transistor as a function of the output of said receiver.

3. An automatic distance amplitude circuit according to claim 2 including a resistor with a slide contact connected between the gate of said field effect transistor and the output of said receiver.

4. An automatic distance amplitude circuit according to claim 1 wherein said variable time constant circuit comprises:

a pair of voltage variable capacitors connected in series between the input of said multivibrator and said compensating network;

a resistor connected between ground and the input of said multivibrator; and an output of said receiver connected to the junction point between said pair of voltage variable capacitors.

* * * * *